(12) United States Patent
Powal

(10) Patent No.: US 11,219,202 B2
(45) Date of Patent: Jan. 11, 2022

(54) BLOWER ATTACHMENT AND SYSTEM FOR ATOMIZING AND DISPENSING LIQUIDS

(71) Applicant: Ryan Powal, Crystal Lake, IL (US)

(72) Inventor: Ryan Powal, Crystal Lake, IL (US)

( * ) Notice: Subject to any disclaimer, the term of this patent is extended or adjusted under 35 U.S.C. 154(b) by 65 days.

(21) Appl. No.: 16/688,662

(22) Filed: Nov. 19, 2019

(65) Prior Publication Data

US 2020/0154691 A1    May 21, 2020

Related U.S. Application Data

(60) Provisional application No. 62/769,362, filed on Nov. 19, 2018.

(51) Int. Cl.
| | | |
|---|---|---|
| *A01M 7/00* | (2006.01) | |
| *B05B 7/24* | (2006.01) | |
| *A01G 20/47* | (2018.01) | |
| *B05B 7/00* | (2006.01) | |

(52) U.S. Cl.
CPC ......... *A01M 7/0007* (2013.01); *B05B 7/2467* (2013.01); *A01G 20/47* (2018.02); *B05B 7/0075* (2013.01)

(58) Field of Classification Search
CPC .. A01M 7/0007; B05B 7/2467; B05B 7/0075; B05B 7/2429; A01G 20/47; A01D 43/14; Y10T 24/44017; Y10T 24/44043; F16L 3/222; F16L 3/223; F16L 33/04; F16L 3/227; F16L 3/12; F16L 3/127

USPC ......................................... 239/146; 248/68.1
See application file for complete search history.

(56) References Cited

U.S. PATENT DOCUMENTS

| | | | | |
|---|---|---|---|---|
| 5,240,186 | A * | 8/1993 | Dobbins | ................... B05B 5/03 239/154 |
| 6,371,388 | B2 * | 4/2002 | Utter | ..................... F24F 5/0035 239/419 |
| 6,786,701 | B1 * | 9/2004 | Huang | ...................... F24F 6/14 417/199.1 |
| 2009/0008473 | A1 * | 1/2009 | Yun | ......................... B05B 7/149 239/85 |
| 2009/0212068 | A1 * | 8/2009 | Rappin | ................. B05B 7/2435 222/1 |
| 2018/0014525 | A1 * | 1/2018 | Bennington | .......... B05B 7/2427 |
| 2018/0207654 | A1 * | 7/2018 | Phua | .................... A61M 11/006 |
| 2020/0047199 | A1 * | 2/2020 | Holznagel | ........... B05B 13/0278 |
| 2020/0093118 | A1 * | 3/2020 | Clarke | ................ A01M 7/0082 |
| 2020/0222923 | A1 * | 7/2020 | Osborne | ............... B05B 7/2416 |

* cited by examiner

*Primary Examiner* — Chee-Chong Lee
*Assistant Examiner* — Kevin Edward Schwartz
(74) *Attorney, Agent, or Firm* — William Gray Mitchell

(57) ABSTRACT

The invention is a universal blower attachment that will fit any standard handheld leaf blower or standard backpack blower and a system for atomizing and dispensing insecticides and other liquids, allowing a pressurized tank to continually force liquid through the nozzle for continuous atomization and spraying into the exhaust stream of the leaf blower.

5 Claims, 4 Drawing Sheets

BLOWER ATTACHMENT AND SYSTEM FOR ATOMIZING AND DISPENSING LIQUIDS

CROSS REFERENCE TO RELATED APPLICATIONS

Not applicable.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention is a universal blower attachment that will fit any standard handheld leaf blower or standard backpack blower and a system for atomizing and dispensing insecticides and other liquids.

Background of the Invention

Individuals and homeowners engaged in the maintenance of their yards and gardens commonly require personal spraying devices for the spraying of liquids such as insecticides, repellants, herbicides and fungicides. Such sprayers tend to be either hand bottles with atomizing nozzles wherein the user's own pumping action provides the spraying power, or pump-style pressurized containers wherein the user activates spraying by pulling a trigger opening a tube to a nozzle, and allowing the pent-up pressure to provide the spraying power.

Known commercial blowers and/or misters often cost from $600 to $1,000 retail, putting them outside the budget of most home users. Thus, home users are left either paying a professional for spraying services, or obtaining one of the personal spraying devices currently available on the market.

Such personal spraying devices suffer from a number of problems. In particular, the amount of power generated by hand pumping or pre-pumping into a pressurized container is quite limited. As such, the range of such a sprayer is similarly limited, often to a few feet when the nozzle is dilated to a stream and to a mere foot or two when the nozzle is set to atomize.

Further, in the case of a pre-pump spray container, the pressure quickly drops upon engagement and requires the user to stop after 30 seconds or less to pump again before spraying can continue.

What is needed is a device or system that will provide high-power and consistent spraying capability to home users. The device and system as described herein will address these issues by applying atomized liquid into the high-power air stream of a powered leaf blower.

BRIEF SUMMARY

In a preferred embodiment, a blower attachment comprising a hose attaching a tank containing liquid to a clip body with a proximal end and a distal end, wherein the proximal end of the clip body is attached to an exhaust end of a blower, wherein the hose runs through the clip body via a collar, the hose ends in an atomizer and such atomizer is fixed into a hose hole.

In another preferred embodiment, the blower attachment as described herein, further comprising a clamp slot and where the means of attachment between each of the blower attachment and blower is a clamp.

In another preferred embodiment, the blower attachment as described herein, wherein the point of attachment between the atomizer and hose comprises an approximately right angle.

In another preferred embodiment, the blower attachment as described herein, wherein the air barrier comprises a flat side allowing a user to lay the blower and attachment down flat.

In an alternate preferred embodiment, a liquid atomizing and dispersal system, comprising the blower attachment as described herein, a pressurized tank, a liquid line connecting the pressurized tank to the atomizer end, and a leaf blower.

In an alternate embodiment, a method of spraying liquids using the blower attachment as described herein, attached to a pressurized tank via an atomizer nozzle and attached to the exhaust pipe of a handheld or backpack-style leaf blower.

DETAILED DESCRIPTION OF THE INVENTION

Figure 1:
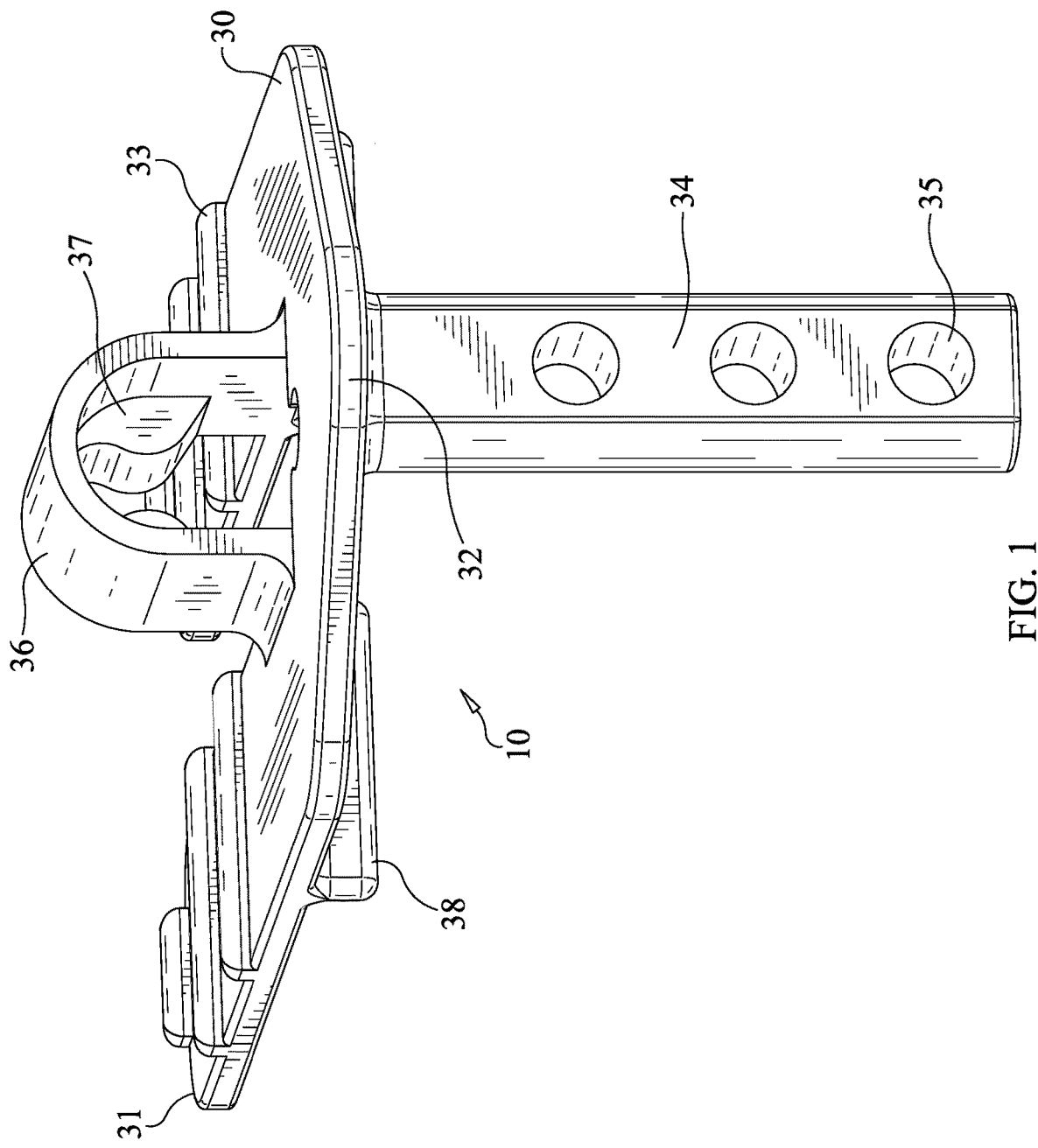
FIG. 1 is a line drawing evidencing the body of a blower attachment for atomizing liquids into the air stream of a leaf blower.

The invention is a blower attachment and atomizing system that will allow use of any standard handheld or backpack leaf blower to spray pesticides, herbicides, fungicides or other liquids, thus providing greater reach and coverage than free-standing home sprayers currently on the market. The atomizing system comprises an atomizer, liquid tube, pressurized liquid container and a leaf blower.

The blower attachment will attach to a hose that also is attached to a standard pump spray tank. The user will be able to choose different size tank such as a 1 gallon or 2 gallon handheld tank, or backpack 3 to 4 gallon tank. The tanks will be pressurized by a manual or powered pump that will push the liquid through the hose, through the atomizer end of the hose, and will be atomized by the blower. The pressurization of the liquid will allow the user to spray in high and low areas. The blower force along with the atomization of the liquid will allow users to disrupt bushes, shrubs and tree leaves to allow application of the atomized liquid throughout the foliage, including under leaves, on stems and other locations where insects may be located.

With specific reference to the disclosed blower attachment, it is to be a universal attachment that will fit any standard handheld leaf blower or standard backpack blower and will be used to atomize and dispense insecticides and other liquids. A pressurized tank will allow the liquid to continually flow through the atomizer end, allowing users to spray high and low areas.

In a preferred embodiment, the blower attachment is adjustably clamped to the exhaust end of the blower with a clamp, pins, screws, or similar means of attachment. A hose for transmitting liquid to be atomized will be attached to each of the pressurized tank acting as a liquid reservoir, as well as to the blower attachment utilizing one or more hose clip components. Such hose clip component(s) will preferably be embodied as horseshoe-shaped plastic clips integrated with the body of the attachment, into which the flexible hose body may be stably and removably inserted. The end of the hose opposite the reservoir tank will comprise an atomizer, with a narrowed diameter to create increased pressure and expel the pumped liquid from the hose as an atomized spray. The body of the attachment will further comprise at least one hose hole into which the atomizer at the end of the hose may be inserted. A preferred design of the hose for such arrangement includes a bend of approximately 90% at the point where the atomizer is attached to the hose, allowing the atomizer to emanate outward at a roughly right angle from the hose for insertion into the hose hole.

In a preferred embodiment, the clip body of the blower attachment will be manufactured using injection molding or a similar type of plastic molding, using a plastic such as PET, PETE, polyester, polypropylene, HDPE, PVC or a similar material. The atomizer end of the hose will preferably be made similarly.

In a preferred embodiment, such hose hole(s) will be bored into a post emanating from the attachment clip body, placing the atomizer in a position roughly in the center of the blower exhaust pipe to which the attachment is clamped. The atomizer will fit into such hole facing away from the blower so that the atomized liquid particles eject in the same direction as the blower air flow, thus allowing the blower air flow to carry away and disperse the atomized liquid particles.

In an alternate embodiment, the hose may comprise a diffuser at the end, such diffuser configured as a mesh or series of concentric circles to further break up and atomize the liquid upon ejection. In another alternate embodiment, the hose may further comprise an adjustment mechanism to regulate the flow of liquid through the hose or atomized fluid ejected from the hose. Such mechanism may take the form of a knob attached to a ball valve or other similar valve-based system. In a more preferred embodiment, the atomizer end itself comprises a turn dial for flow regulation.

A liquid atomizing and dispersal system, comprising clip body, blower, hose and reservoir tank, may be used for spraying any liquid useful in an outdoor setting, including but not limited to pesticides, herbicides, fertilizers, mold and mildew removers or detergents.

DETAILED DESCRIPTION OF THE DRAWINGS

FIG. 1 is a drawing of the blower attachment 10 alone, comprising clip body 30 with proximal end 31 and distal end 32, with clamp slots 33 for securing the clamp (not pictured) in place over the exhaust pipe 61 (not pictured) of a blower and collar 36 comprising hose clip 37. Backstop 38 is an emanation from the clip body made to fit against the rim of such blower exhaust. Integral with the clip body 30 is hose post 34 emanating downward from near the distal end and comprising hose holes 35. When in use, the hose 70 (not pictured) will be clipped into hose clip 72, then continue downward for insertion into one of the hose holes 35.

Figure 2:
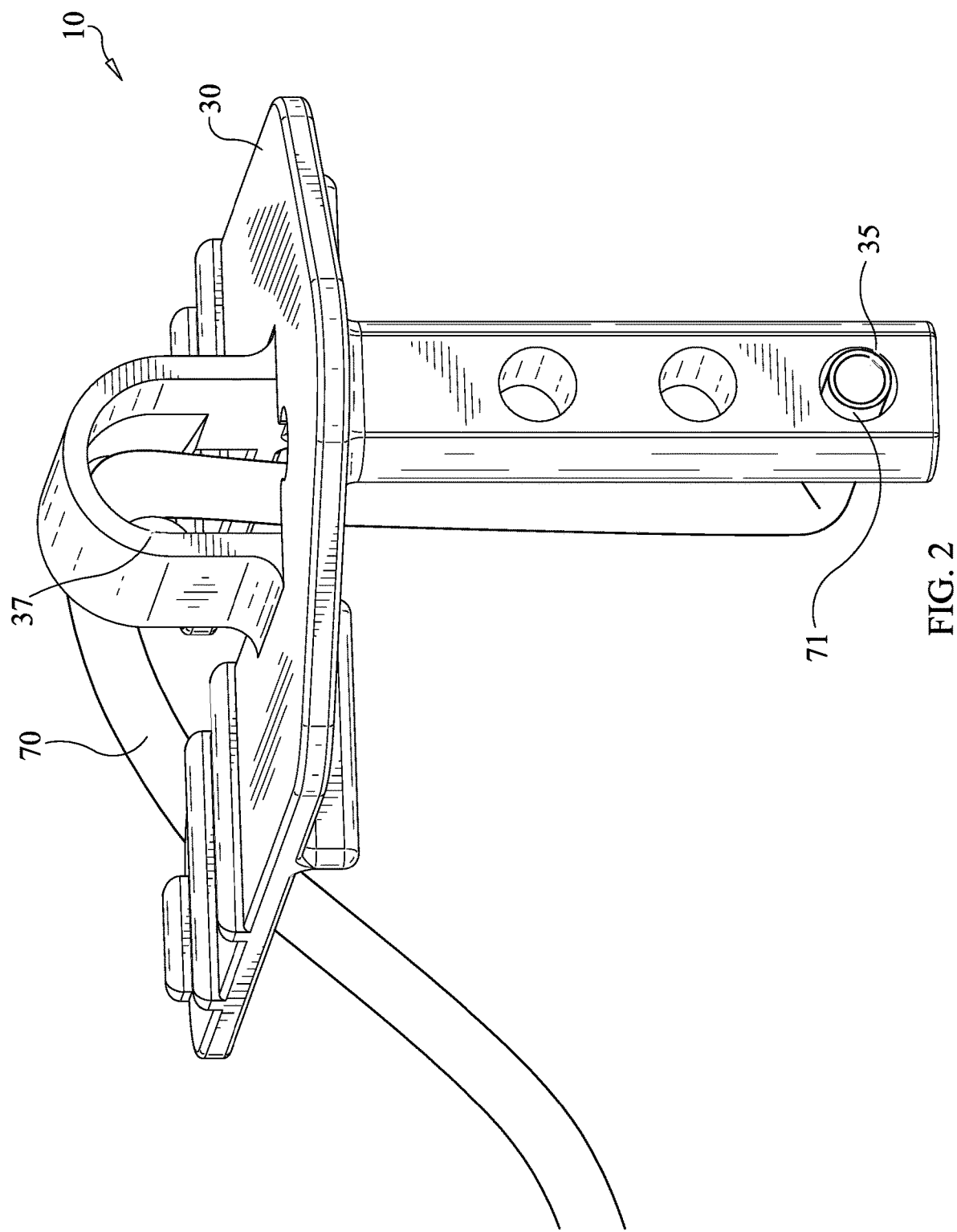
FIG. 2 is a line drawing evidencing the blower attachment of FIG. 1, together with a hose for delivering atomized liquid.

FIG. 2 shows the blower attachment 10 with hose 70 extending from tank 50, such hose clipped into hose clip 37, with the hose ending in atomizer end 71, such end centered within a hose hole 35.

Figure 3:
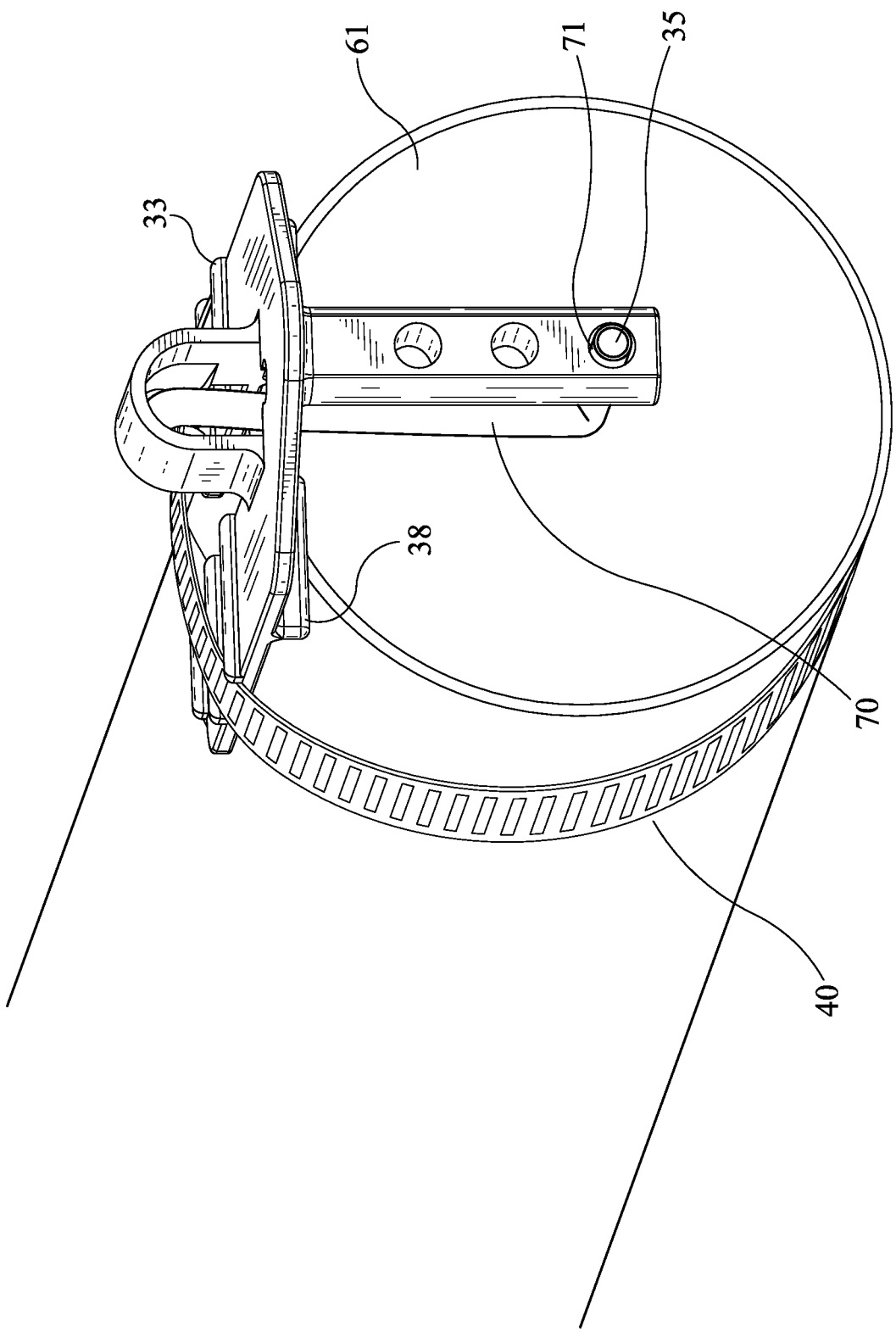
FIG. 3 is a line drawing evidencing the blower attachment of FIGS. 1 and 2, clamped over the exhaust pipe of a leaf blower.

FIG. 3 shows blower attachment 10, with hose 70 clipped into hose clip 37 within collar 36, with clip body 30 clamped at its proximal end 31 onto blower exhaust pipe 61 by clamp 40, which clamp is arranged between clamp slots 33. In this way, atomizer end 71 of the hose is directed away from blower exhaust 61, so that as atomized liquid is expelled from hose 70, the atomized liquid is caught in and propelled by the air stream emanating from the blower exhaust 61.

Figure 4:
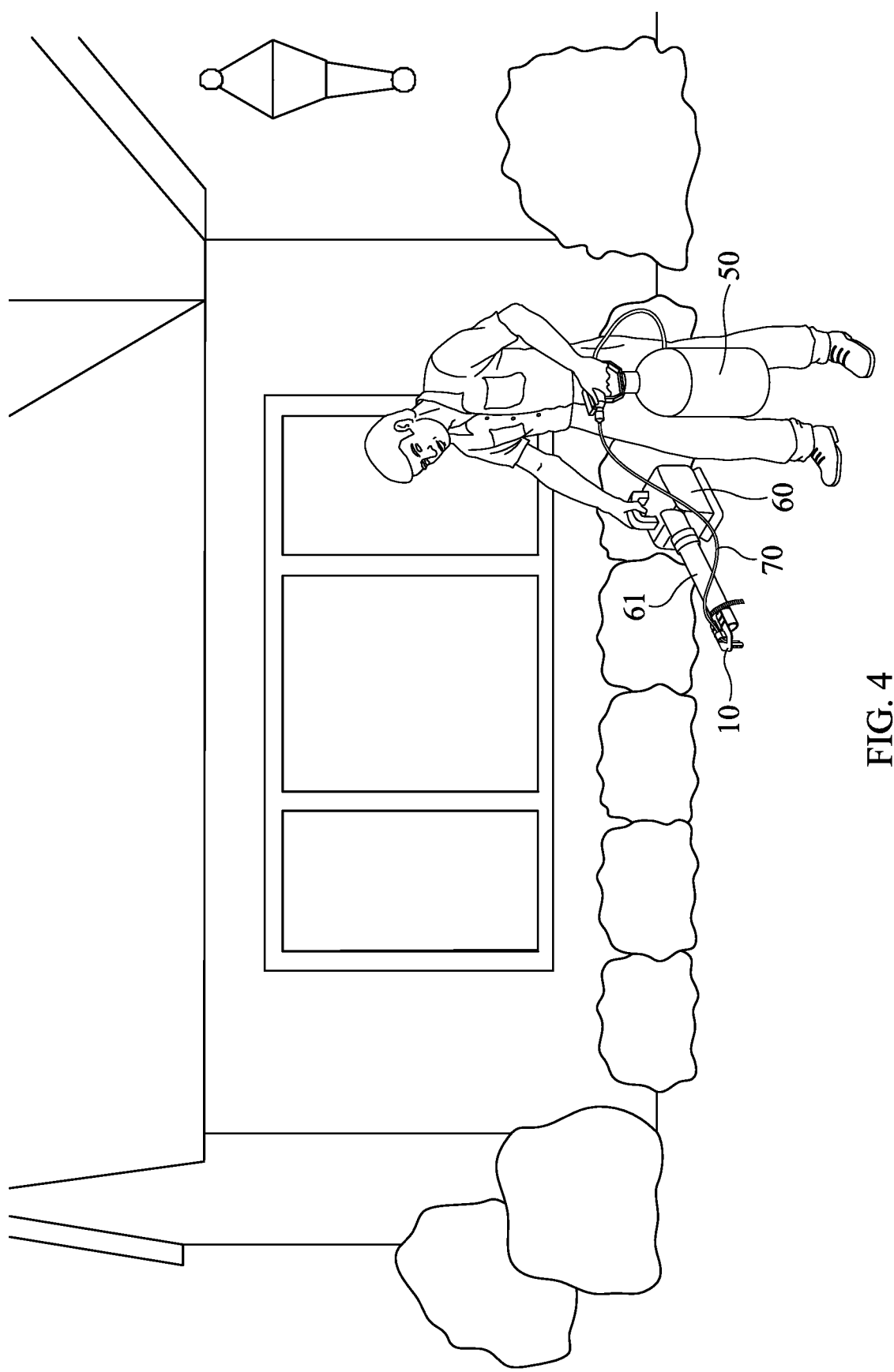
FIG. 4 is a line drawing evidencing the blower attachment of the previous figures in use with a liquid reservoir tank and leaf blower.

FIG. 4 is an illustration of an entire liquid atomizing and dispersal system comprising a blower attachment 10, clamped to a blower 60 at the blower exhaust pipe 61. A hose 70 is clipped into the blower attachment and extends to a pressurized tank 50 containing liquid to be atomized and spread, such tank held by the user. In other embodiments, either the blower, the tank or both could be embodied as a backpack, with a wheeled pull cart, or in other known styles for ease of use.

INVENTION COMPONENTS

10 Blower attachment
30 Clip body
31 Body proximal end
32 Body distal end
33 Clamp slots
34 Hose post
35 Hose hole
36 Collar
37 Hose clip
38 Backstop
40 Clamp
50 Tank
60 Blower
61 Blower exhaust pipe
70 Hose
71 Atomizer end The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A blower attachment comprising: a clip body embodied as a flat plate with a proximal end, a collar and a hose post comprising a plurality of hose holes, wherein the clip body is configured for a hose to attach a tank containing liquid to the clip body, wherein the proximal end of the clip body is configured to attach directly to an outer surface of an exhaust end of a blower, wherein the clip body is configured to have the hose run through the clip body via the collar, the hose post is embodied as a rectangular strip emanating from the clip body at a right angle and overlaying a front edge of the exhaust end of the blower, the hose ends in an atomizer end and the plurality of hose holes are configured for the atomizer end to be fixed into a hose hole of the plurality of hose holes so that the atomizer end is centered over and pointing in the same direction as the exhaust end of the blower.

2. The blower attachment of claim 1, further comprising a clamp and clamp slot, wherein the clamp directly secures the clip body to an outer surface of the exhaust end of the blower.

3. The blower attachment of claim 1, wherein fixing of the atomizer end through one of the plurality of hose holes bends the hose at an angle between 80 and 100 degrees.

4. A liquid atomizing and dispersal system comprising the blower attachment of claim 1, a tank, a hose with an atomizer end, and a leaf blower, wherein the hose connects the tank to the atomizer end and the user holds the blower in one hand and the tank in the other.

5. A method of spraying liquids using the blower attachment of claim 1.

* * * * *